Feb. 12, 1963    B. C. GOLDEN    3,077,168
BAG MAKING MACHINE-HEM FORMING, DRAWSTRING
INSERTING AND LOOP FORMING MECHANISM
Filed Sept. 19, 1960    6 Sheets-Sheet 1

INVENTOR
Bertie C. Golden
BY Mumm & Lane
ATTORNEY

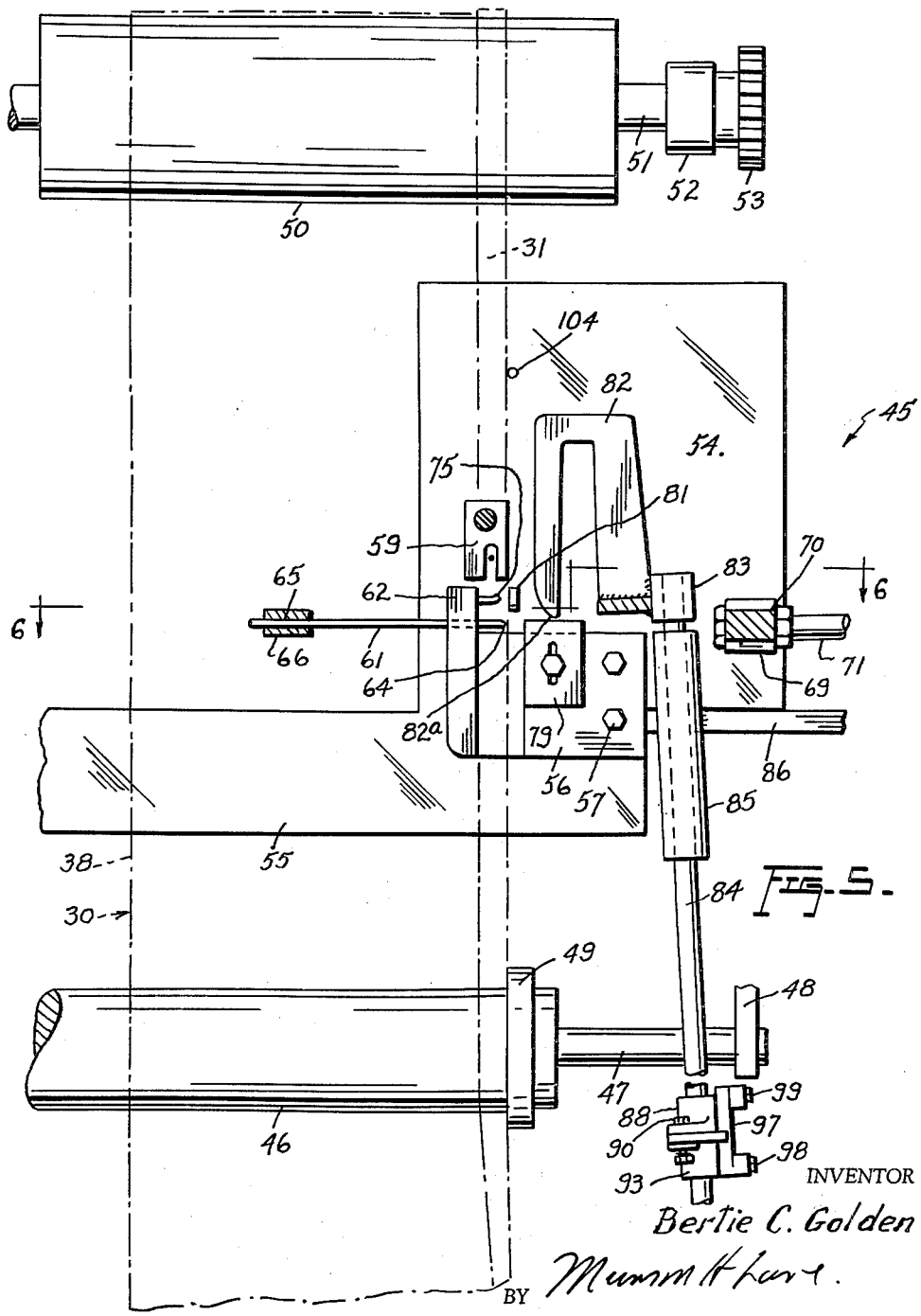

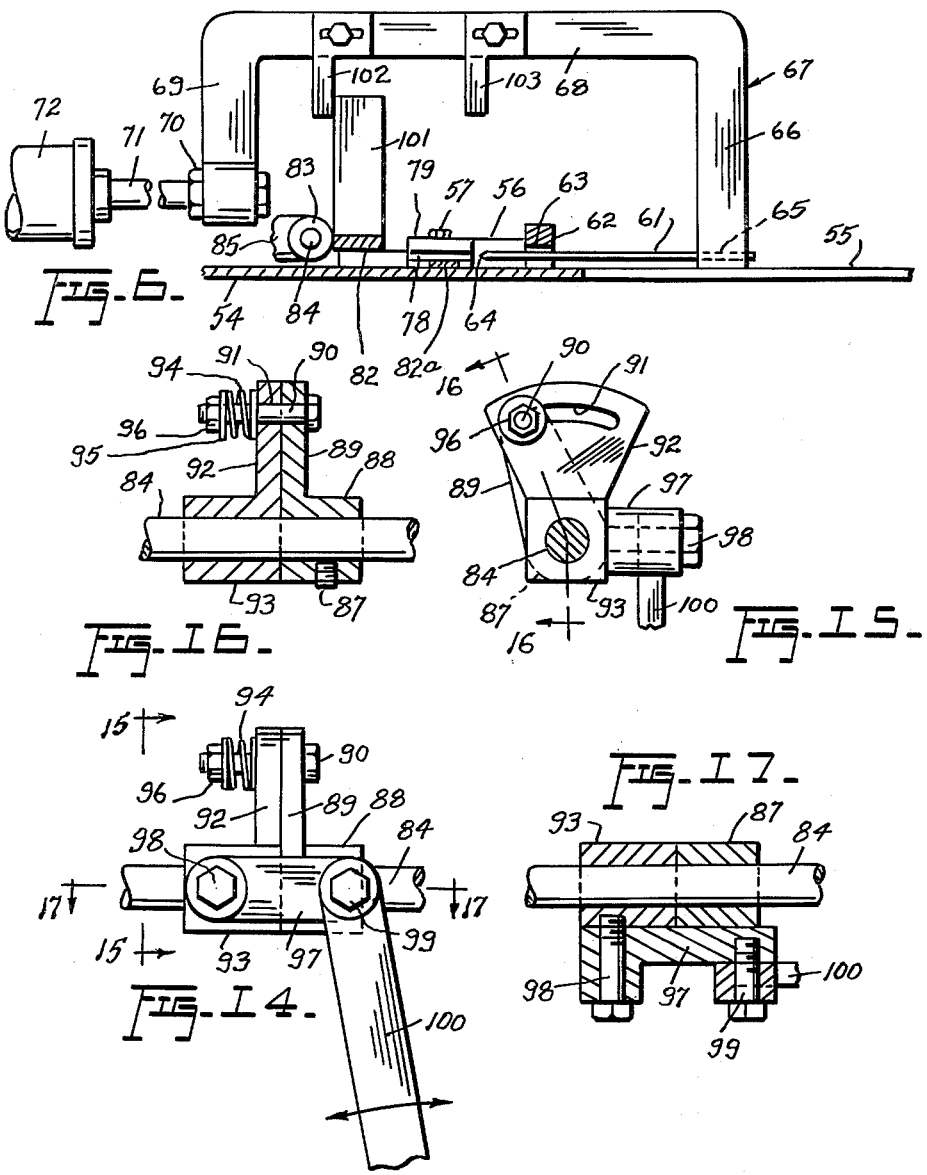

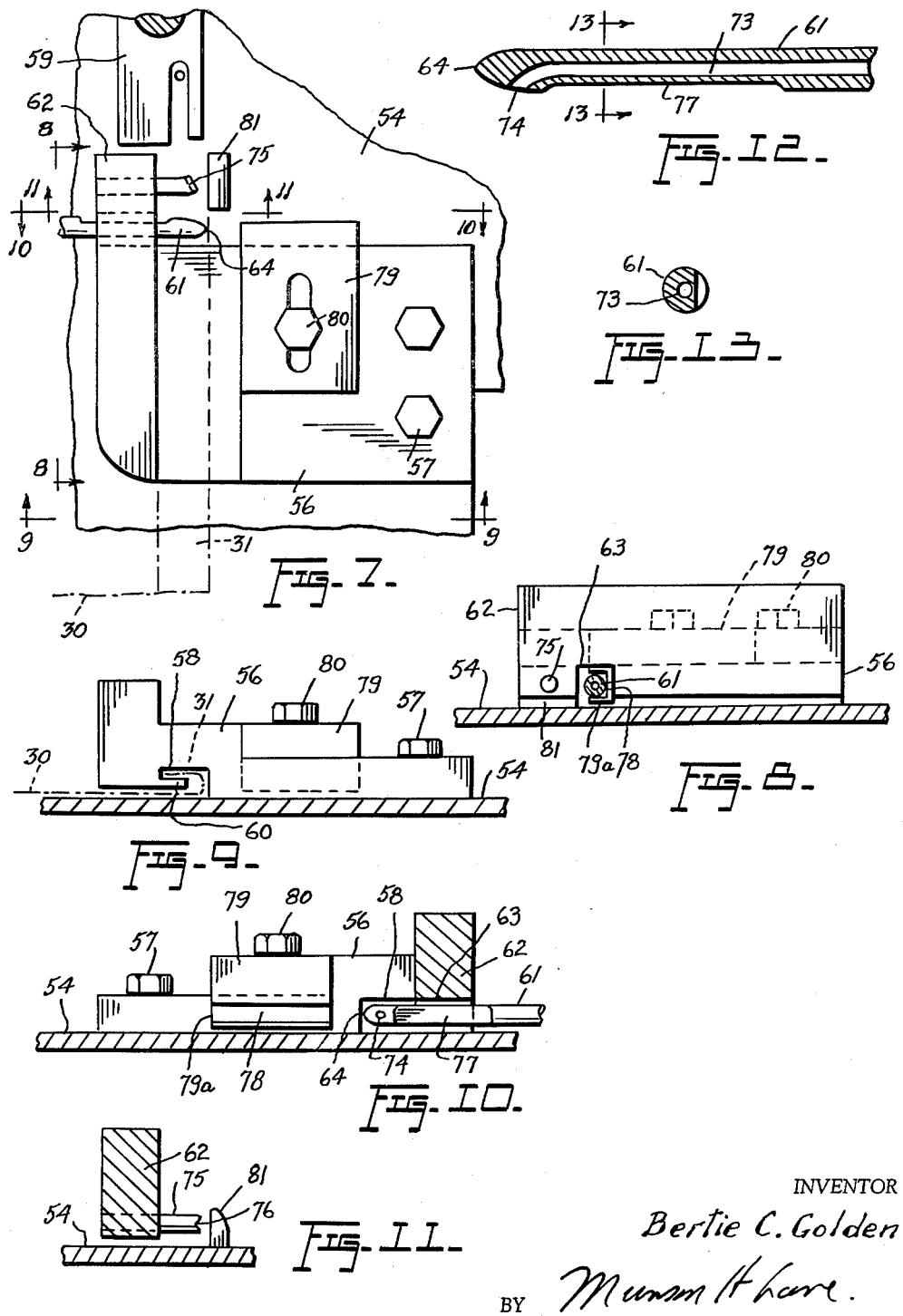

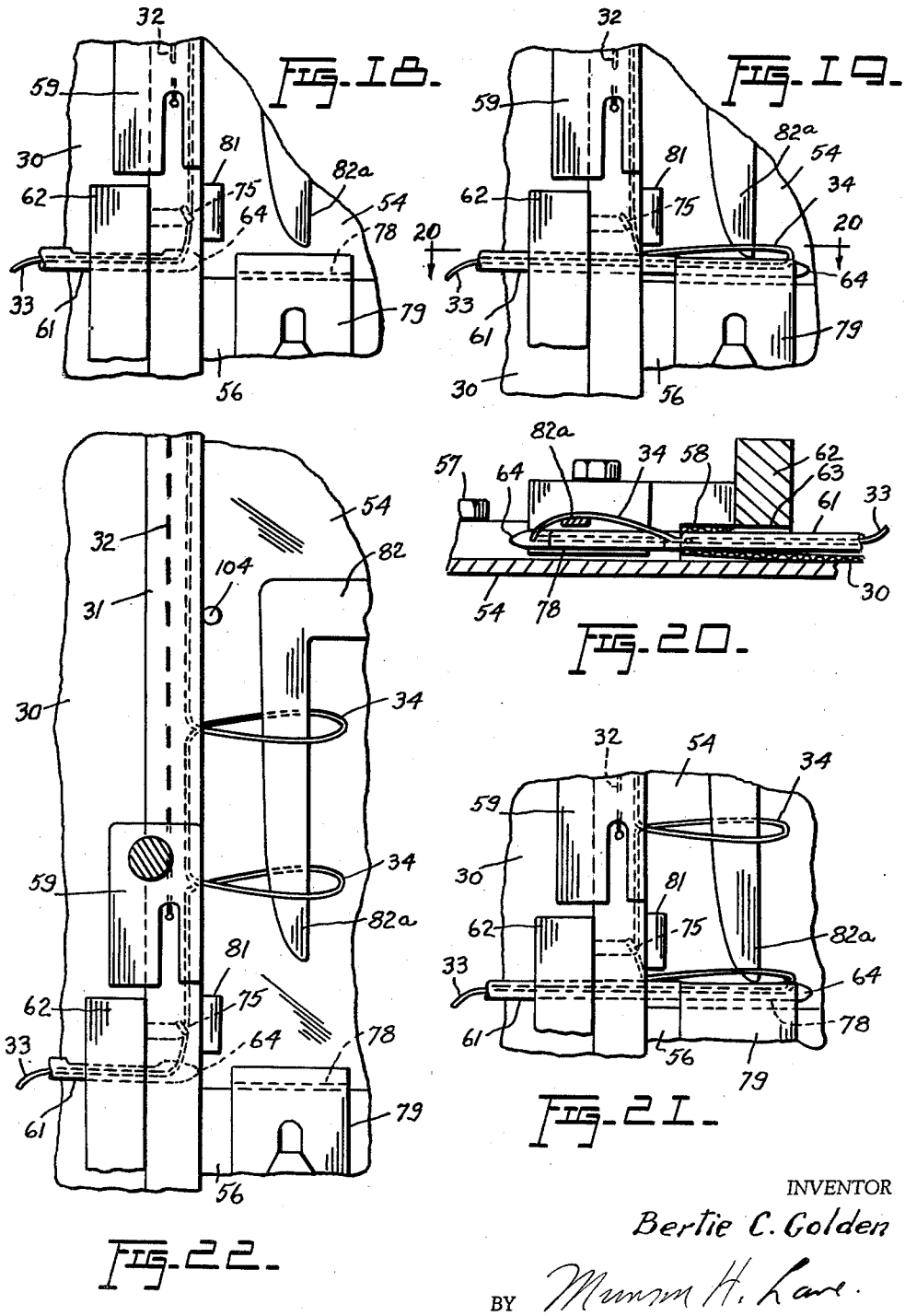

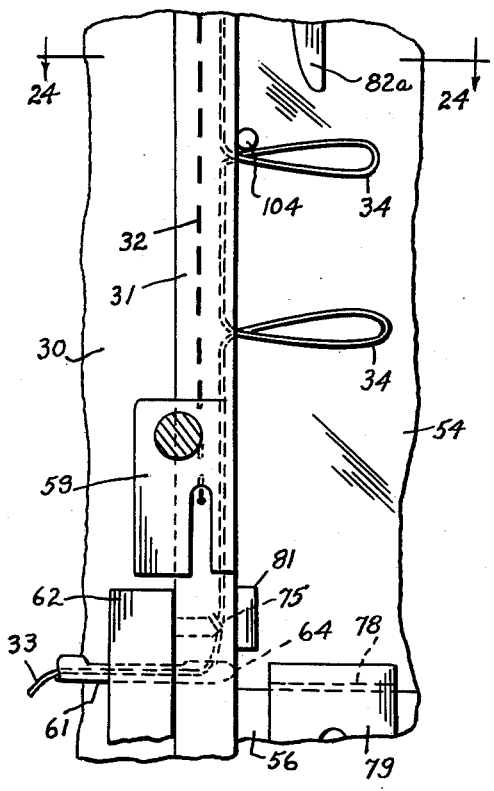
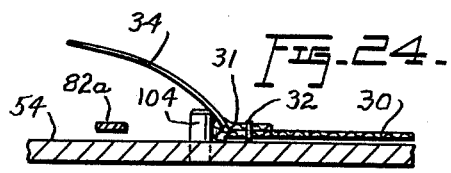

United States Patent Office 3,077,168
Patented Feb. 12, 1963

3,077,168
BAG MAKING MACHINE-HEM FORMING, DRAW-STRING INSERTING AND LOOP FORMING MECHANISM
Bertie C. Golden, Richmond, Va., assignor, by mesne assignments, to Millhiser Bag Company, Incorporated, a corporation of Virginia
Filed Sept. 19, 1960, Ser. No. 56,914
10 Claims. (Cl. 112—2)

This invention relates to new and useful improvements in bag making machines, and in particular the invention concerns itself with machines for manufacturing cloth or other fabric bags which are equipped with a drawstring to serve as a closure for their mouth.

Some conventional machines of this type are adapted to form the bag and provide the same with a hem at its mouth to receive the drawstring which is subsequently installed by a separate machine known as the bag stringing machine. Some effort has been made in the past to combine the bag making and stringing operations into one, that is, into a combined operation capable of being carried out by one machine rather than two, and the principal object of the present invention is to provide an improved mechanism for making a drawstring-equipped bag mouth, which mechanism is adapted for use in a variety of different bag making machines as a component thereof for making a drawstring-equipped bag in one continuous operation and in a more efficient, expeditious and commercially economical manner than was heretofore possible.

Briefly, the invention resides in the provision of a mechanism for operating on a running web of cloth or other fabric so as to form a hem thereon, inserting a drawstring into the hem while it is being formed and, at predetermined intervals, to project the draw string outwardly from the hem to form pairs of loops which are coordinated with the running length of the web in such manner that when the web is subsequently cut into individual bag units, the loops are in a position to be withdrawn and form free ends of the drawstring embedded in the hem at the mouth of the bag.

With the foregoing more important object and features in view and such other objects and features as may become apparent as this specification proceeds, the invention will be understood from the following description taken in conjunction with the accompanying drawings, wherein like numerals of reference are used to designate like parts, and wherein:

FIGURE 5 is a fragmentary top plan view showing the mechanism of a bag making machine for making a drawstring-equipped bag mouth;

FIGURE 6 is a fragmentary vertical sectional view, taken substantially in the plane of the line 6—6 in FIGURE 5;

FIGURE 7 is a fragmentary plan view on an enlarged scale of the drawstring inserting and loop forming portion of the mechanism;

FIGURE 8 is a fragmentary vertical sectional view, taken substantially in the plane of the line 8—8 in FIGURE 7;

FIGURE 9 is a fragmentary vertical sectional view, taken substantially in the plane of the line 9—9 in FIGURE 7;

FIGURE 10 is a fragmentary vertical sectional view, taken substantially in the plane of the line 10—10 in FIGURE 7;

FIGURE 11 is a fragmentary vertical sectional detail, taken substantially in the plane of the line 11—11 in FIGURE 7;

FIGURE 12 is a fragmentary, enlarged longitudinal sectional view of the needle;

FIGURE 13 is a cross-sectional detail, taken substantially in the plane of the line 13—13 in FIGURE 12;

FIGURE 14 is a fragmentary side elevational view of the loop forming member actuating means;

FIGURE 15 is a fragmentary sectional view, taken substantially in the plane of the line 15—15 in FIGURE 14;

FIGURE 16 is a fragmentary sectional view, taken substantially in the plane of the line 16—16 in FIGURE 15;

FIGURE 17 is a fragmentary sectional view, taken substantially in the plane of the line 17—17 in FIGURE 14;

FIGURE 18 is a fragmentary plan view showing an initial step in the drawstring loop forming operation;

FIGURE 19 is a fragmentary plan view showing a second step in the loop forming operation;

FIGURE 20 is a fragmentary sectional detail, taken substantially in the plane of the line 20—20 of FIGURE 19 and showing raising of the drawstring by the loop forming member;

FIGURE 21 is a fragmentary plan view showing a further step in the loop forming operation, the first loop of a pair being already formed on the loop forming member and the second loop being formed;

FIGURE 22 is a fragmentary plan view showing a further step in the loop forming operation, with both loops of a pair already formed on the loop forming member;

FIGURE 23 is a fragmentary plan view showing a still further step in the loop forming operation, with the loop forming member withdrawn from the loops; and FIGURE 24 is a fragmentary sectional detail, taken substantially in the plane of the line 24—24 in FIGURE 23 and showing one of the formed loops being sustained out of possible interference with the loop forming member.

Figure 1:
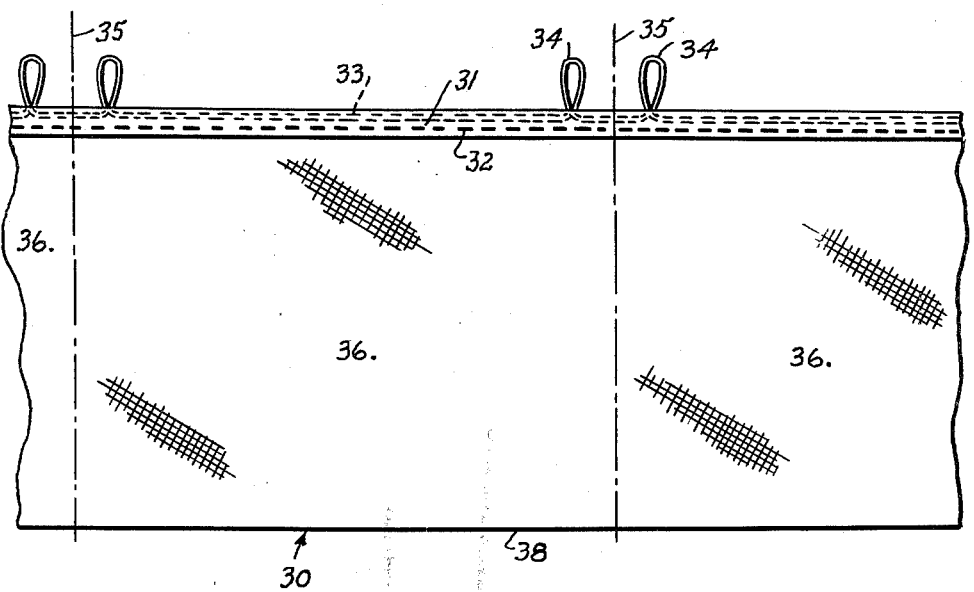
FIGURE 1 is a fragmentary plan view of the hemmed web with inserted drawstring forming pairs of loops.
Figure 2:
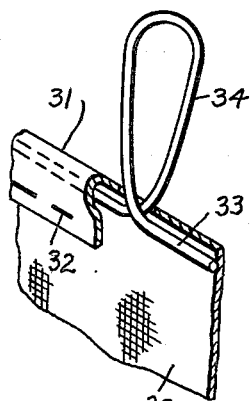
FIGURE 2 is a fragmentary perspective view, partly broken away, showing the arrangement of one of the drawstring loops.
Figure 3:
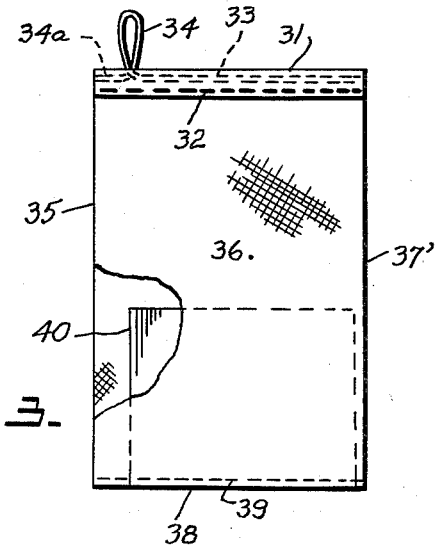
FIGURE 3 is a plan view of one of the bag units cut away from the web and partly broken away to show a tag therein.
Figure 4:
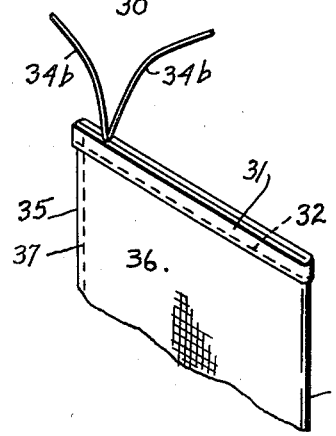
FIGURE 4 is a fragmentary perspective view of one of the bags with the drawstring loops pulled out.

Referring now to the accompanying drawings in detail, more particularly to FIGURES 1-4 inclusive, the reference numeral 30 designates a running length of a web of cloth or other fabric, which has been formed at one longitudinal edge thereof with a hem 31 secured by stitching 32. A drawstring 33 is contained within the hem 31 and projects outwardly therefrom at predetermined intervals to form pairs of loops 34, it being noted that the loops in each pair are closely spaced and so located in relation to the running length of the web that when the web is cut along the lines 35 to form individual bag units 36, the cutting lines 35 pass between the loops in each pair. After being cut from the web, each of the bag units 36 is doubled or folded upon itself along a fold line 37 as shown in FIGURE 3 so that the two loops 34 of the bag unit become juxtaposed, being located adjacent the cut edges 35 of the bag unit, which cut edges are subsequently sewed together by the stitching 37, as shown in FIGURE 4. The free edges 38 at the bottom of the bag are also stitched together as indicated at 39, and if desired, a suitable tag 40 may be inserted in the bag and secured therein by the stitching 39, so that when the bag is sewn and turned inside out, the tag 40 projects from the bottom of the bag and may be used for inscription or other indicia to identify the contents of the bag when the latter is placed in use. It will be noted that cutting of the web along the lines 35 also severs the drawstring 33 at points between the loops 34 in each pair, thus leaving free drawstring ends 34a at the loops as shown in FIGURE 3. These free ends are subsequently pulled out so that the loops 34 disappear by being transformed into free end portions 34b of the drawstring as shown in FIGURE 4 and, by pulling on these free end portions of the string in the well known manner, the mouth of the bag may be contracted into a closure.

The present invention concerns itself primarily with a mechanism for forming the hem 31 on a running length of the web 30, inserting the drawstring 33 into the hem while it is being formed, and periodically projecting the drawstring outwardly from the hem to form the pairs of loops 34. As such, the mechanism in accordance with the invention may be embodied in a suitable bag making machine as a component thereof, the machine also having means for folding and cutting the web into individual bag units simultaneously with cutting of the drawstring, inserting the tag 40, providing the stitching 37 and 39, and pulling out the free ends 34a of the drawstring loops, so that the bags emerge from such a machine in the condition shown in FIGURE 4, in readiness to be turned inside out. As already noted, the disclosure in this application deals only with the hem forming, drawstring inserting and loop forming mechanism.

This mechanism is designated generally by the reference numeral 45 in FIGURE 5 and embodies in its construction a freely rotatable roller 46 supported by a shaft 47 journalled in suitable bearings 48 on the frame of the machine. The web 30, after unwinding from a reel, passes over the roller 46 and engages a flange 49 on the roller, whereby one longitudinal edge portion of the web is folded upon itself to form what subsequently becomes the hem 31. The web is pulled over the roller 46 by a drive roller 50 carried by a shaft 51 journalled in bearings 52 on the machine frame, the shaft 51 and roller 50 being driven by suitable gearing 53. The mechanism 45 is located between the rollers 46 and 50 for operation on the running web, and after passing over the roller 50, the web travels to the other aforementioned components of the machine where it is cut and folded into individual bag units, stitched, et cetera, as has been already outlined.

The mechanism 45 is supported by a suitable platform 54 which is disposed at one side of the web and also extends under the web to underlie its hemmed edge portion. Moreover, the platform 54 is provided integrally with an extension arm 55 which extends under the web and projects beyond its unhemmed edge 38, as will be clearly apparent, the platform 54 together with the extension arm 55 thus preventing the stretch of the web between the rollers 46, 50 from sagging. A guide block 56 is secured to the platform 54 by suitable screws or bolts 57 and, as is best shown in FIGURES 9 and 20, is provided with a passage 58 through which travels the folded longitudinal edge portion of the web on its way to a sewing machine 59 which makes the stitching 32 to form the hem 31. As best shown in FIGURE 9, the block 56 has a rib 60 which is disposed in the passage 58 and serves to keep the folded over edge of the web spaced above the web itself to accommodate a needle 61 hereinafter described, it being understood, of course, that the folded over edge is subsequently brought in contact with the body of the web by the sewing machine 59. The block 56 is provided with an extension piece 62 having a recess 63 at the underside thereof through which the needle 61 freely extends. The needle has a piercing end 64 and is rigidly mounted at its other end as at 65 in the lower end portion of one arm 66 of an inverted U-shaped yoke 67. The latter also includes a bight portion 68 and a second arm 69 which is secured as at 70 to a reciprocable piston rod 71 of a double-acting air cylinder 72, so that when the cylinder is energized, a reciprocating movement is imparted to the yoke 67 and needle 61. The needle normally occupies the position shown in FIGURES 5 and 18 wherein its piercing end 64 rides inside the fold of the web edge 31. However, upon energization of the cylinder 72, the needle is projected outwardly through the fold of the web to the position shown in FIGURE 19, for example. The cylinder 72 is quick acting so that the projection and retraction of the needle is almost instantaneous and does not materially hinder the running movement of the web.

The needle 61 is provided with a longitudinal bore or passage 73 having an outlet opening 74 adjacent the piercing end 64. The drawstring 33, after unwinding from a suitable spool on the frame of the machine, is threaded through the passage 73, outwardly through the opening 74 and into the fold of the web during formation of the hem 31, as illustrated in FIGURE 18. A guide pin 75 is carried by the extension piece 62 and provided with a groove 76 best shown in FIGURE 11, whereby to guide the drawstring 33 while it is being embedded in the hem. The piercing end portion of the needle 61 is provided with a laterally recessed or flattened region 77, the purpose of which will be hereinafter explained. In its projected position shown in FIGURE 19, the flattened region 77 of the needle is oriented in the direction of travel of the web and the projected needle is received in a groove or channel 78 formed in a needle guide block 79 which is secured to the aforementioned block 56 by suitable bolt means 80, the block 79 having a depending portion 79a in which the groove 78 is formed. An upstanding guide plate or element 81 is provided on the platform 54 at the fold of the web slightly in advance of the presser foot of the sewing machine 59 so as to keep the hem ahead of the presser foot from buckling or shifting laterally outwardly.

Formation of the drawstring loops is effected in co-ordination with the reciprocable needle 61 by a hook-shaped loop forming member 82 which is rigidly secured to a collar 83 carried by a rod 84. The latter is slidably and rotatably mounted in a tubular sleeve 85 which is secured to a suitable machine frame member 86 and the loop forming member is provided with a tapered end portion 82a which is movable toward and away from the block 79 when the rod 84 is reciprocated in the sleeve 85. The rod 84 may also partly rotate in the sleeve 85 whereby the tapered end 82a of the member 82 may be raised and lowered relative to the needle 61.

As is best shown in FIGURES 5 and 14–16, the rod 84 has rigidly mounted thereon, as by a set screw 87, a boss 88 provided with an arm 89, the latter being equipped with a bolt 90 which is movable in an arcuate slot 91 formed in a sector 92 affixed to a boss 93, rotatably positioned on the rod 84 in abutment with the boss 88. The bolt 90 carries a compression spring 94, a washer 95 and a nut 96 whereby the sector 92 and the arm 89 are urged into frictional engagement, yet permitting oscillatory movement of the arm 89 relative to the sector 92 within the limits of travel of the bolt 90 in the slot 91. A link 97 is pivoted at one end thereof as at 98 to the boss 93 while its other end is pivoted as at 99 to an oscillatory lever or arm 100 which is actuated by a suitable cam mechanism of the machine.

As is best shown in FIGURE 6, the portion of the loop forming member 82 which is secured to the collar 83 has rigidly secured thereto an upstanding strap 101 which is rockable from side to side by a pair of dogs 102, 103 adjustably mounted on the bight portion 68 of the yoke 67. With the needle 61 retracted and the dog 102 in engagement with the strap 101, the rod 84 is disposed in the sleeve 85 so that the tapered end 82a of the member 82 rests on the platform 55 below the groove or channel 78 in the needle guide block 79. However, when the cylinder 72 actuates the yoke 67 so as to project the needle 61 into the groove 78 in the block 79, the dog 102 is disengaged from the strap 101 and the dog 103 comes in engagement with the strap, causing the same to rock and impart partial rotation to the rod 84, thus raising the tapered end 82a of the member 82 relative to the projected needle, as illustrated in FIGURE 20. This movement is facilitated by the aforementioned movement of the bolt 90 in the slot 91 and the frictional engagement of the sector 92 with the arm 89 will sustain the tapered end 82a in its raised position until retraction of the needle 61 when the dog 102 again comes into engagement with the strap 101 to rock the rod 84 to its initial position. Apart from its raising and lowering movement as above explained, the member 82 is movable toward and away from the block 79 by action of the lever 100 through the medium of the link 97, boss 93, sector 92, arm 89 and boss 88. The loop forming member 82 is movable rearwardly, that is, in the direction of travel of the web, well behind the sewing machine 59 as shown in FIGURE 23, and an upstanding pin 104 is provided on the platform 54 at the fold of the web at a point slightly in advance of the rearmost position of the member 82, as shown. The purpose of this pin will be hereinafter explained.

The operation of the invention will now be described with particular reference to FIGURES 18–24.

With the web 30 running over the rollers 46, 50 and the hem 31 being formed on the web, the needle 61 is initially in its retracted position as shown in FIGURE 18 so that its piercing end 64 is within the fold of the web and the drawstring 33 passes through the bore 73 of the needle, through the outlet opening 74 and through the groove 76 of the drawstring guide 75 into the hem. Movement of the arm 100 and rod 84 causes the loop forming member 82 to advance toward the block 79 with the tapered end 82a of the member 82 lowered to the platform 54. At that point, the cylinder 72, acting through the medium of the yoke 67, projects the needle 61 through the fold of the hem into the groove 78 in the needle guide block 78 to the position shown in FIGURE 19, with the drawstring 33 feeding through the bore 73 of the needle so that a portion of the drawstring is streched at the outside of the needle between the opening 74 and an aperture formed in the fold of the web by the piercing end of the needle during its projection. This is clearly shown in FIGURE 19 and it will be noted that the stretched portion of the drawstring, as mentioned above, is disposed adjacent and extends longitudinally of the flat region 77 at the outside of the needle.

By this time, engagement of the dog 103 with the strap 101 causes the tapered end 82a of the member 82 to be raised relative to the needle and during its raising movement the member end 82a engages the aforementioned streched portion of the drawstring at the outside of the needle, raising the same to the position shown in FIGURE 20. The flat region 77 of the needle permits the member end 82a to come sufficiently close to the needle to engage the drawstring as mentioned above. As the needle is subsequently retracted to its initial position through the same aperture in the fold of the web through which it was projected, the drawstring forms the loop 34 which is caught on the tapered end portion 82a of the member 82 and slides rearwardly thereon with the running movement of the web while the member 82 remains relatively stationary. In so doing, it is to be noted that the frictional engagement of the sector 92 and arm 89 sustains the member 82a in its raised position during the brief interval of retraction of the needle 61, whereupon the member portion 82a is lowered to the platform by contact of the dog 102 with the strap 101 when the needle is retracted.

The second loop in the pair is formed in the same manner as the first loop and also assumes its position on the member 82, with both loops sliding rearwardly thereon as illustrated in FIGURE 22 while the member 82 remains relatively stationary and the needle is retracted. By the time the first of the two loops approaches the pin 104, the rod 84 is slid by the lever 100 so as to move the member 82 away from the block 79 to the ultimate position shown in FIGURE 23. The member 82 travels rearwardly at a faster rate than the running movement of the web and, as a result, the member portion 82a is withdrawn from both loops and engagement of the loops with the pin 104 causes them to be raised above the member 82 so that they do not become entangled therewith when the member subsequently moves forward for the next cycle of operation.

As shown in FIGURE 5, the axis of the rod 84 is preferably somewhat oblique toward the web rather than being parallel thereto, so that when the member 82 moves rearwardly away from the block 79, it comes closer to the web than when it is at the block. As a result, the loops formed on the member become somewhat slackened to faciltate withdrawal of the member 82 therefrom at the end of the loop forming operation.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, such as may fall within the spirit and scope of the invention as claimed.

What is claimed as new is:

1. In a bag making machine, a mechanism for making a drawstring-equipped bag mouth, said mechanism comprising in combination, means for folding one longitudinal edge portion of a running web upon itself preliminary to forming a hem, a needle reciprocable transversely of the direction of travel of the running web, said needle having a piercing end and being provided with a longitudinal drawstring passage terminating in a lateral outlet opening adjacent said piercing end, means for reciprocating said needle whereby its piercing end portion may be projected outwardly through the fold of the running web and subsequently retracted into the fold, a needle guide block having a groove therein for receiving said needle in its projected position, an elongated loop forming member reciprocable alongside the fold of the running web toward and away from said needle guide block, said loop forming member having a tapered end movable toward the needle in the groove of said needle guide block and engageable with a drawstring passing outwardly through said outlet opening and exteriorly of the needle into the fold of the web, means for raising the tapered end of said loop forming member relative to the needle whereby to form a loop in the drawstring when the needle is subsequently retracted with the formed loop being slidable along the loop forming member with the movement of the running web, and means for sewing the folded edge portion of the web to form a hem with the drawstring extending therethrough and the formed loop of the drawstring projecting outwardly therefrom.

2. The device as defined in claim 1 together with a drawstring guide disposed in the folded edge portion of the running web between said needle and said hem sewing means.

3. The device as defined in claim 1 together with means responsive to reciprocation of said needle for raising and lowering said loop forming member relative to the needle.

4. In a bag making machine, a mechanism for making a drawstring-equipped bag mouth, said mechanism comprising in combination, means for folding one longitudinal edge portion of a running web upon itself preliminary to forming a hem, a needle reciprocable transversely of the direction of travel of the running web, said needle having a piercing end portion provided with a drawstring receiving opening, means for reciprocating said needle whereby its piercing end portion may be projected outwardly through the fold of the running web and subsequently retracted into the fold, a needle guide block having a groove therein for receiving said needle in its projected position, an elongated loop forming member reciprocable alongside the fold of the running web toward and away from said needle guide block, said loop forming member having a tapered end movable toward the needle in the groove of said needle guide block and engageable with a drawstring passing through said needle opening into the fold of the web, means for raising the tapered end of said loop forming member relative to the needle whereby to form a loop in the drawstring when the needle is subsequently retracted with the formed loop being slidable along the loop forming member with the movement of the running web, and means for sewing the folded edge portion of the web to form a hem with the drawstring extending therethrough and the formed loop of the drawstring projecting outwardly therefrom.

5. The device as defined in claim 4 together with a drawstring guide disposed in the folded edge portion of the running web between said needle and said hem sewing means.

6. The device as defined in claim 4 together with means responsive to reciprocation of said needle for raising and lowering said loop forming member relative to the needle.

7. In a bag making machine, a mechanism for making a drawstring-equipped bag mouth, said mechanism comprising in combination, means for folding one longitudinal edge portion of a running web upon itself preliminary to forming a hem, a needle carrier reciprocable transversely of the direction of travel of the running web, a needle supported by said carrier and having a piercing end portion provided with a drawstring receiving opening, means for reciprocating said carrier whereby the piercing end portion of said needle may be projected outwardly through the fold of the running web and subsequently retracted into the fold, an elongated loop forming member movably disposed substantially in parallel at the outside of the web fold and having a tapered end portion oriented against the direction of travel of the running web, means for reciprocating said loop forming member substantially in parallel to the web fold whereby the tapered end portion of the loop forming member may be brought toward the piercing end portion of said needle when the needle is projected to engage a drawstring passing through the needle opening into the fold of the web, means for alternately raising and lowering the tapered end portion of the loop forming member relative to the needle whereby to form a loop in the drawstring when the needle is subsequently retracted with the formed loop sliding along the loop forming member with the movement of the running web, the reciprocation of the loop forming member being operative to subsequently withdraw the loop forming member from the formed loop, and means for sewing the folded edge portion of the web to form a hem with the drawstring extending therethrough and the formed loop of the drawstring projecting outwardly therefrom.

8. The device as defined in claim 7 together with a needle guide block having a groove therein for receiving the piercing end portion of the needle in its projected position, said loop forming member being reciprocable toward and away from the groove in said guide block.

9. The device as defined in claim 7 wherein said loop forming member is rockably mounted for raising and lowering the tapered end portion thereof, said means for raising and lowering said tapered end portion comprising an arm secured to said loop forming member for rocking movement therewith, and a pair of spaced detents provided on said needle carrier and engageable with opposite sides of said arm for imparting rocking movement thereto during reciprocation of the needle carrier.

10. The device as defined in claim 7 together with a drawstring guide disposed in the folded edge portion of the running web between said needle and said hem sewing means.

References Cited in the file of this patent
UNITED STATES PATENTS

| | | |
|---|---|---|
| 1,920,822 | West | Aug. 1, 1933 |
| 1,920,823 | West et al. | Aug. 1, 1933 |
| 2,477,053 | Ewer et al. | July 26, 1949 |
| 2,546,623 | Abler | Mar. 27, 1951 |
| 2,715,374 | Carrier | Aug. 16, 1955 |